United States Patent [19]

Wakatsuki et al.

[11] 4,032,946

[45] June 28, 1977

[54] APPARATUS FOR SELLING BETTING TICKETS

[75] Inventors: Yuzo Wakatsuki; Masanobu Miyake, both of Tokyo; Kazuyuki Hano, Kawasaki, all of Japan

[73] Assignees: Fujitsu Ltd., Kawasaki; The Japan Racing Association, Tokyo, both of Japan

[22] Filed: Sept. 8, 1976

[21] Appl. No.: 721,578

[30] Foreign Application Priority Data

Sept. 13, 1975 Japan .......................... 50-111237

[52] U.S. Cl. .............................................. 364/900

[51] Int. Cl.² ...................... G06F 3/12; G06F 7/38; G06F 15/02; G06F 15/28

[58] Field of Search .................... 340/172.5; 445/1; 235/61.1

[56] References Cited

UNITED STATES PATENTS

| | | | |
|---|---|---|---|
| 3,124,674 | 3/1964 | Edwards et al. | 235/61.1 |
| 3,252,149 | 5/1966 | Weida et al. | 340/172.5 |
| 3,327,292 | 6/1967 | Eriksson et al. | 340/172.5 |
| 3,505,646 | 4/1970 | Affel, Jr. et al. | 340/172.5 |
| 3,593,303 | 7/1971 | Streets et al. | 340/172.5 |

*Primary Examiner*—Harvey E. Springborn
*Attorney, Agent, or Firm*—Staas & Halsey

[57] ABSTRACT

Herein disclosed is an apparatus for selling betting tickets. Said apparatus has a function which can correct the partial information recorded on said betting tickets. The apparatus according to the present invention comprises a register which stores the information to be sent to an electronic computer and also stores the information sent from the electronic computer, a control device which controls the sending and the receiving of information between said apparatus and said computer, a keyboard for applying the information to the register, a reading device which reads the information recorded on the betting ticket and supplies the content of said information to the register, a display device for displaying the content of the register, a means which is connected to the register and which indicates the portion to be deleted from the information recorded on the betting ticket, and a printing device which is connected to the register and which prints information on the betting ticket according to the content of said register.

14 Claims, 14 Drawing Figures

APPARATUS FOR SELLING BETTING TICKETS

The present invention relates to an apparatus for selling betting tickets which can correct the partial information recorded on said betting tickets.

In gambling, such as at horse races, bicycle races, and auto races, spectators can buy betting tickets while attending such races. Profits can be gained if the numbers on the betting tickets match the winning results of the races. On the conventional betting tickets, information recorded on each ticket were called "Forecast numbers" that is, the frame numbers of the first and second place horses in the race, such as "3–4", and the unit price, such as "1000 Yen", of the betting ticket. As the unit price of said ticket was predetermined, when spectators wished to double or triple their bet on the same betting ticket, they were required to buy a multiple number of the same type of betting ticket. For eliminating the above-mentioned superfluous procedure variable unit tickets are being used. That is, the price which is recorded in the ticket can be changed. Therefore, one ticket wherein the unit price is recorded as "2,000 Yen" corresponds to two tickets wherein the unit price is recorded as "1,000 Yen".

However, such conventional betting tickets or unit betting tickets were required to be bought before every race due to the constantly changing forecast numbers. As an outcome of this requirement, ticket offices were crowded at all times with spectators who were buying such tickets. Thus, for alleviating congestion and confusions, many more offices had to be provided.

For completely removing the above-mentioned problem of congestion and confusion at the ticket offices, the same applicant invented the multi-betting ticket by which the spectator could carry multiple bets at the same time. On said multi-betting ticket, the information on said ticket discloses, for example, the race numbers, the information concerning the determining of the number of the winning horse W(win), the placing of the first two horses P(place), the forecasting of the race F(forecast), the betting number, and the number of the unit of the bet. By using such multi-betting tickets, operations of the ticket office could be considerably simplified and the confusion at the ticket windows could be tremendously relieved.

However, on said multi-betting ticket, often it is required to correct or to delete the partial information, because of information being mistyped by the operator or because the better wishes to change the original information. However, with respect to the conventional betting ticket, partial information on said ticket cannot be corrected, because the ticket is sold as one betting unit. Furthermore, under conventional betting, when spectators wish to abandon their betting tickets, said ticket is treated by a conventional machine, the subtracter. That is, the operator enters the information to be deleted (such as the race number and the forecast number recorded on said ticket) into said subtractor by the keyboard of said subtracter. By this process, the race number and the forecast number are both erased from the file of the central electronic computer, and thereby invalidating said betting ticket. However, partial correction of information recorded on the multi-betting ticket cannot be carried out by the above-mentioned subtracter, because an entirely new corrected ticket must be made in order to correct the partial information on the multi-betting ticket.

The object of the present invention is to provide an apparatus for printing the betting ticket and also for correcting some parts of the information recorded on said betting ticket.

For achieving the above-mentioned object, the characteristic features of the present invention comprise a register which stores the information to be sent to an electronic computer and also stores the information sent from the electronic computer, a control device which controls the sending and the receiving of information between said apparatus and said computer, a keyboard for applying the information to the register, a reading device which reads the information recorded on the betting ticket and supplies the content of said information to the register, a display device for displaying the content of the register, a means which is connected to the register and which indicates the portion to be deleted from the information written on the betting ticket, and a printing device which is connected to the register and which prints on the betting ticket in accordance with the content of said register.

Further features and advantages of the present invention will be apparent from the ensuing description with reference to the accompanying drawings to which, however, the scope of the invention is in no way limited.

Figure 8A:
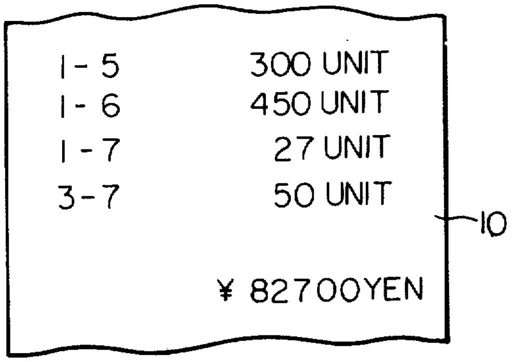
Figure 8B:
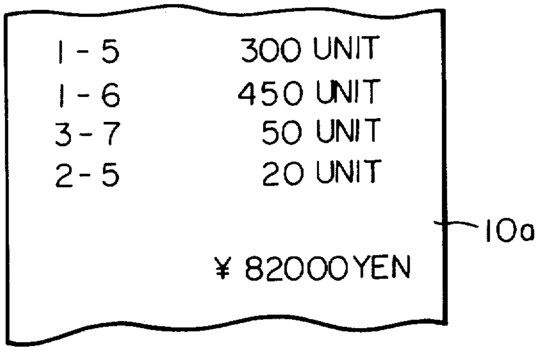
Figure 11:
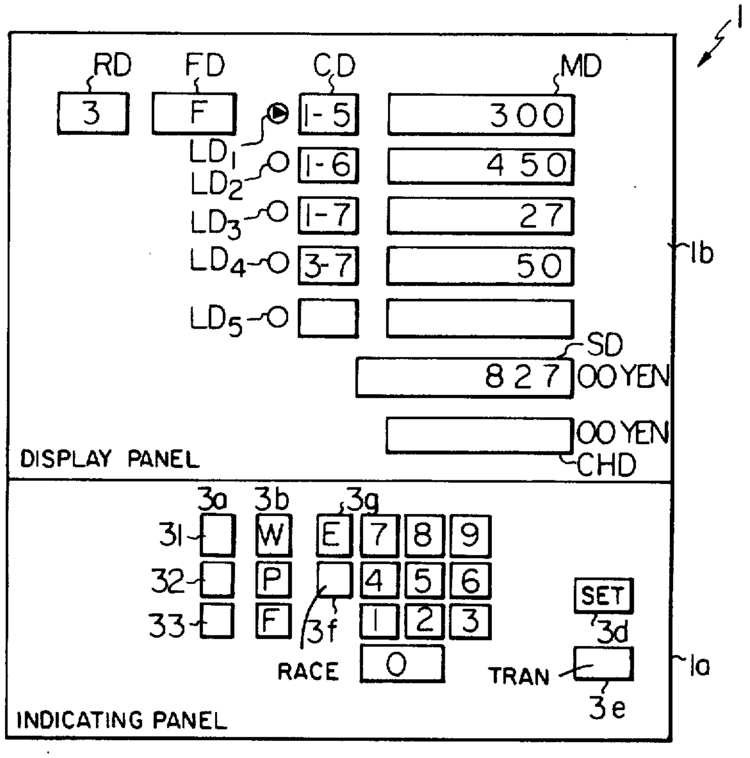

FIGS. 8A, 8B; 9A, 9B and 10A, 10B respectively show the information of the original multi-betting tickets and the newly corrected betting tickets; and FIG. 11 shows another embodiment of the operating panel which has a function of partially correcting the information recorded on the multi-betting ticket according to the present invention.

Figure 1:
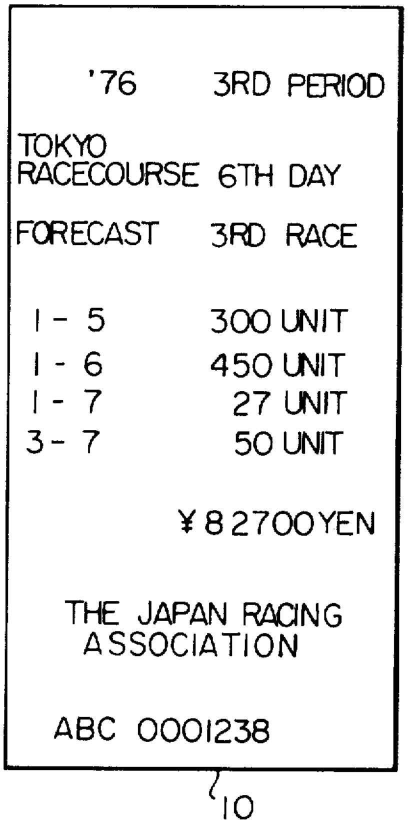
FIG. 1 shows one example of the multi-betting ticket according to the present invention.

Referring to FIG. 1, the multi-betting ticket 10 according to the present invention includes the following sample information:

the date, that is, "'76" "3RD Period", "6th DAY"; the name of the race course; the race number;

the kind of betting information, that is, "FORECAST";

the betting numbers, such as 1-5, 1-6, 1-7 and 3-7;

The numbers of the betting units;

the total sum, "82,700 Yen", which is calculated with "one betting unit" being equal to 100 Yen;

the name of the sponsorship, "The Japan Racing Association"; and the code number, "ABC0001238".

The betting ticket 10 shown in FIG. 1 relates to the third race of the sixth day of the 3rd period, 1976 at the Tokyo Race Course and includes the betting information of four betting numbers and of a total of 827 units. This betting ticket 10 corresponds to 827 separate conventional betting tickets. If a 200 Yen-ticket, 500 Yen-ticket and 1000 Yen-ticket are used, the betting ticket 10 actually corresponds to only 84 separate conventional tickets. Ticket 10 corresponds also to a four-unit ticket.

It is understood that the form of the multi-betting ticket is in no way limited just to the information given in FIG. 1. Modifications varying the kinds of information to be disclosed on the ticket are feasible. For example, betting numbers concerning W (Win), P(Place) and F(Forecast), and betting information concerning different races can be simultaneously included on said multi-betting ticket. Therefore, the spectator can enjoy the races and bet all day long by using only one multi-betting ticket. Further, betting information concerning a number of different days can be included on the same multi-betting ticket. However, when additional betting information cannot be further accommodated on the same multi-betting ticket, then said excess of information is recorded onto a plurality of multi-betting tickets.

One embodiment of the terminal equipment which sells the above-mentioned multi-betting tickets is shown in FIGS. 2 through 6.

Figure 2:
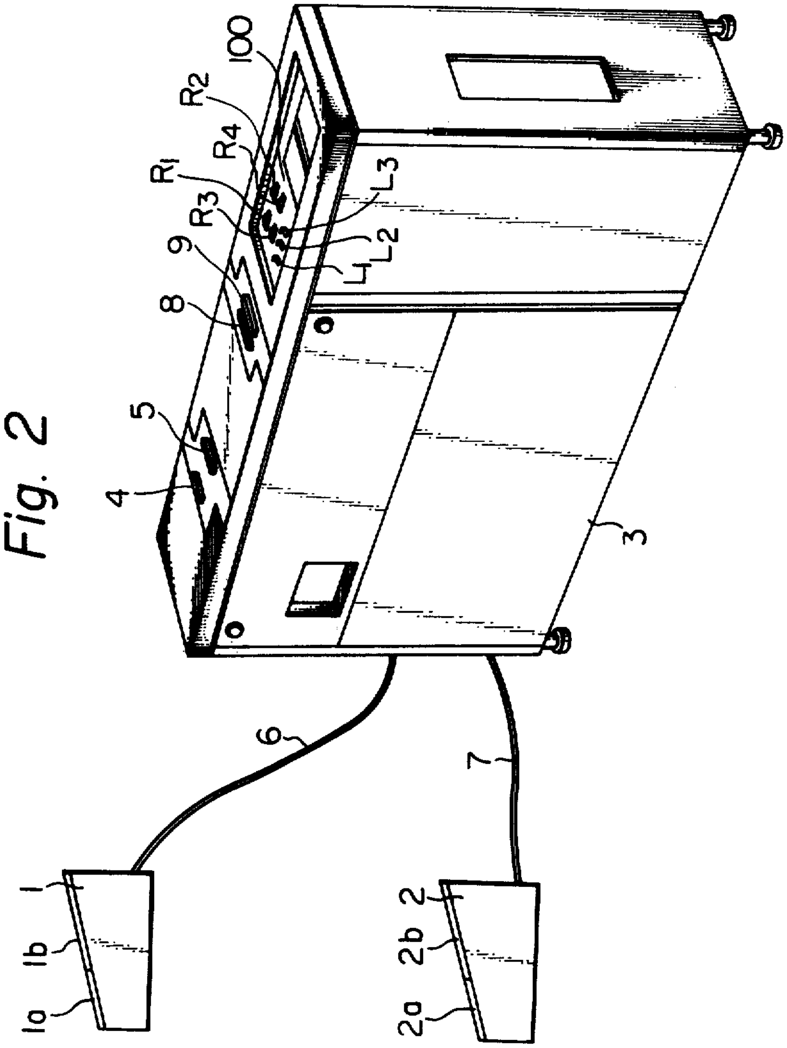
FIG. 2 shows an external view of one example of an apparatus for selling betting tickets according to the present invention.

Referring to FIG. 2, the apparatus for printing the multi-betting ticket comprises input devices 1 and 2 through which the operator inputs the betting information and a main body 3. As we will explain hereinafter, the two input devices have the same construction and are connected by cables 6 and 7, respectively, to the main body 3 commonly provided with respect to the two input devices 1 and 2. The main body is provided with openings 4 and 5 for producing, as an output, the printed betting tickets. These openings are provided for two operators positioned on both sides of the main body 3. The main body 3 also is provided with insertion openings 8 and 9 for inserting the betting ticket to be corrected; with an operating panel 100 which is provided with rotary switches $R_1$ through $R_4$ for setting the semi-fixed information such as "Time", "Name of the race course", "Date", "Year"; and with alarm lamps $L_1$ through $L_3$ which light when the magnetic read or write function is not operating correctly, when the paper feed is finished, or when paper jam occurs.

Figure 3:
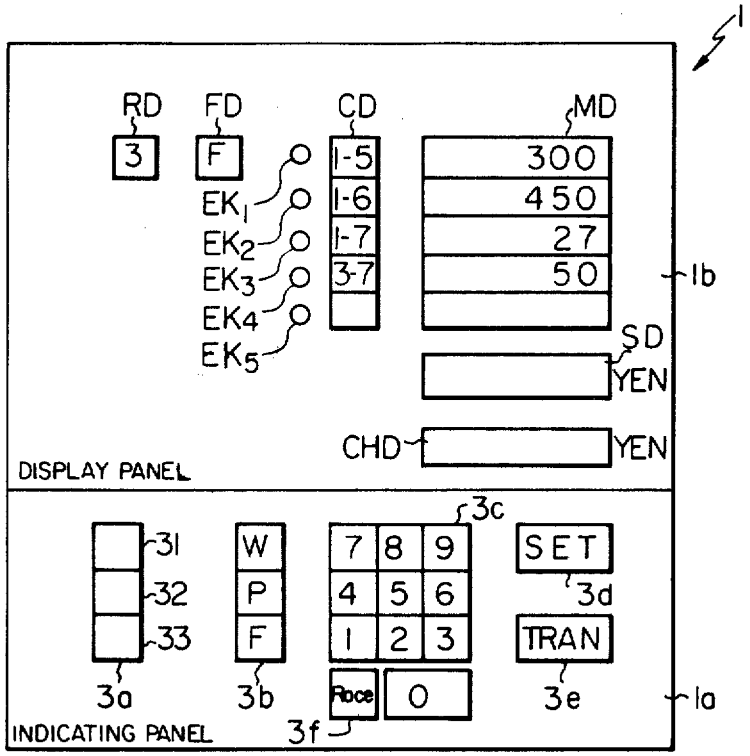
FIG. 3 shows an operating panel of the apparatus shown in FIG. 2.

Referring to FIG. 3, the operating panel in the input devices 1 and 2 includes an indicating panel 1*a* and a display panel 1*b*. The display panel 1*b* includes a race number display RD for indicating the race number, a betting information display FD, erasing indicators $EK_1$ through $EK_5$, a betting number display CD, unit number display MD, a balance display CHD which displays the difference between the original amount and the corrected amount of the multi-betting ticket, and a total amount display SD for displaying the total amount of the display MD. The indicating panel 1*a* is composed of a keyboard which includes a group 3*a* of mode input keys (that is, a betting key 31 operated when the betting ticket is to be sold, a subtracting key 32 operated when the partial information is to be corrected, and a repaying key 33 operated when the repayment is to be carried out); a group 3*b* of betting kind keys (that is, three keys which are indicated by letters W(Win), P(Place) and F(Forecast)); a group 3*c* of keys composed of ten keys 0 through 9 for typing the race numbers, the betting numbers and unit number; a set key 3*d*; a transmission key 3*e*; and a race number input key 3*f* for inputting and changing the race numbers by operating the ten keys 3*c*.

Figure 4:
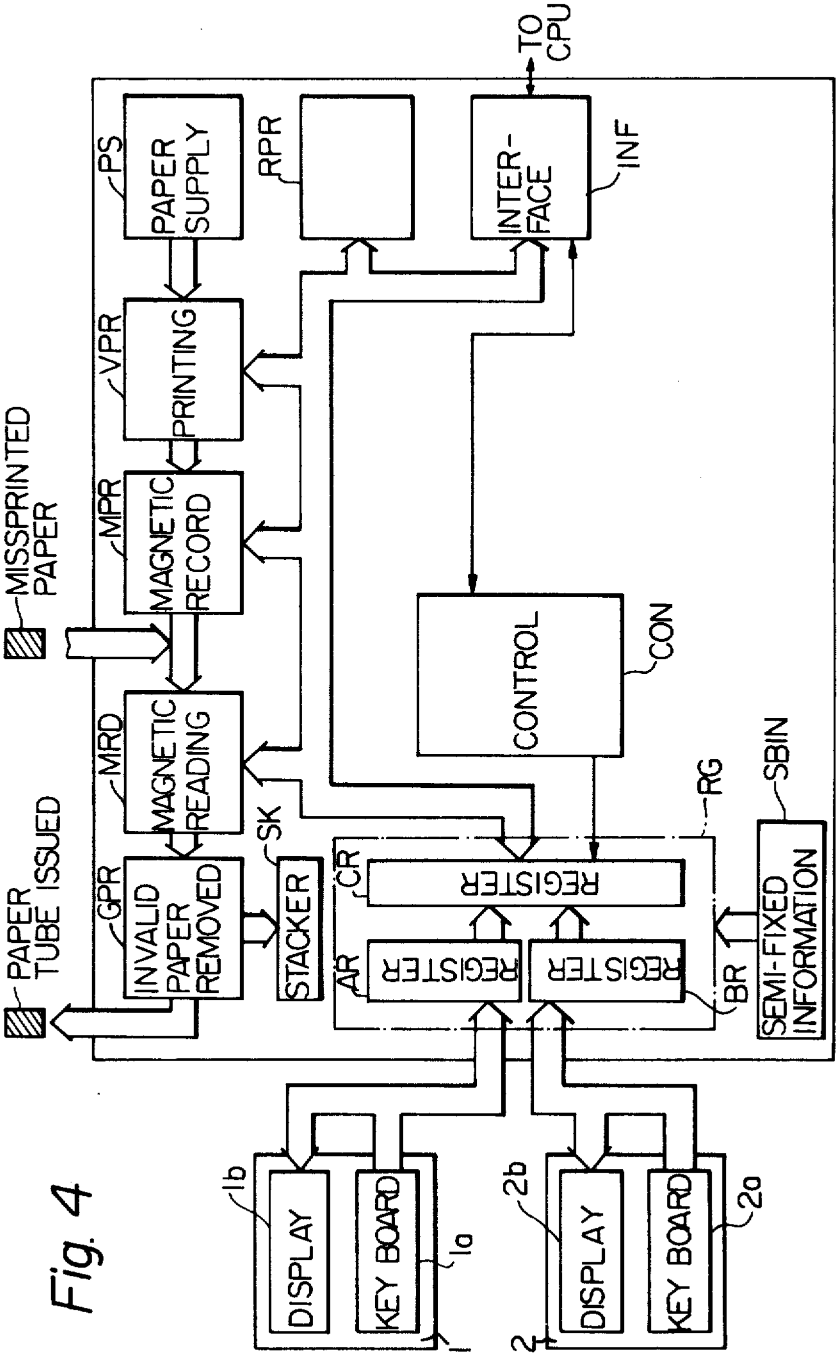
FIG. 4 shows the electronic block diagram of the apparatus showing in FIG. 2.

Referring to FIG. 4 which shows the block diagram of the apparatus according to the present invention, an input register AR is connected to the keyboard 1*a* of the input device 1 for storing the betting information supplied from the keyboard 1*a*, and an input register BR is connected to the keyboard 2*a* of input device 2 storing the betting information supplied from the keyboard 2*a*. A register CR stores the contents of the input registers AR or BR corresponding to the transmission key 3*e* (FIG. 3) of input device 1 or 2 when said key 3*e* is operated. When the multi-betting ticket is being printed according to the content of one input register, AR and BR, the content of the other register is not shifted immediately to the register CR by the operation of the transmission key 3*e* corresponding to said other register, but is shifted to the register CR after the printing of the above multi-betting ticket is completed. Each of the input registers AR and BR is also connected to the display panels 1*b* and 2*b* for displaying the contents of said input registers AR and BR, respectively. When the content of the input register AR or BR is shifted to the register CR, said content is transmitted via an interface INF to the computer CPU under the control of a control device CON.

When the computer CPU receives the betting information from the register CR, the computer checks the betting information as to whether said information contains an error or not. When no error is found in said information, the computer files the race numbers and the betting number of said information for calculating the dividend. The computer also calculates the total sum of the betting units, outputs said total sum to the register CR, and then feeds back a print command signal, which commands the printing, to the control circuit CON via the interface INF.

When an error is discovered on the multi-betting ticket, for example, when the betting numbers of the race do not apply to said race, or when the value of the unit, the name of the race course, the race number, or the kind of the race is not included in said betting information, the error lamp (not shown in the display panel) corresponding to the particular type of error is then switched on.

When the signal which commands the printing is sent from the computer CPU to the control circuit CON, said circuit CON controls a paper supply PS, a printing device VPR and a magnetic recorder MPR so as to print the betting information and the semi-fixed information on the surface of the ticket, to magnetically record said information on the reverse side of said paper, and to produce a ticket from one of the openings 4 or 5 provided in the main body 3 (FIG. 2).

Figure 5:
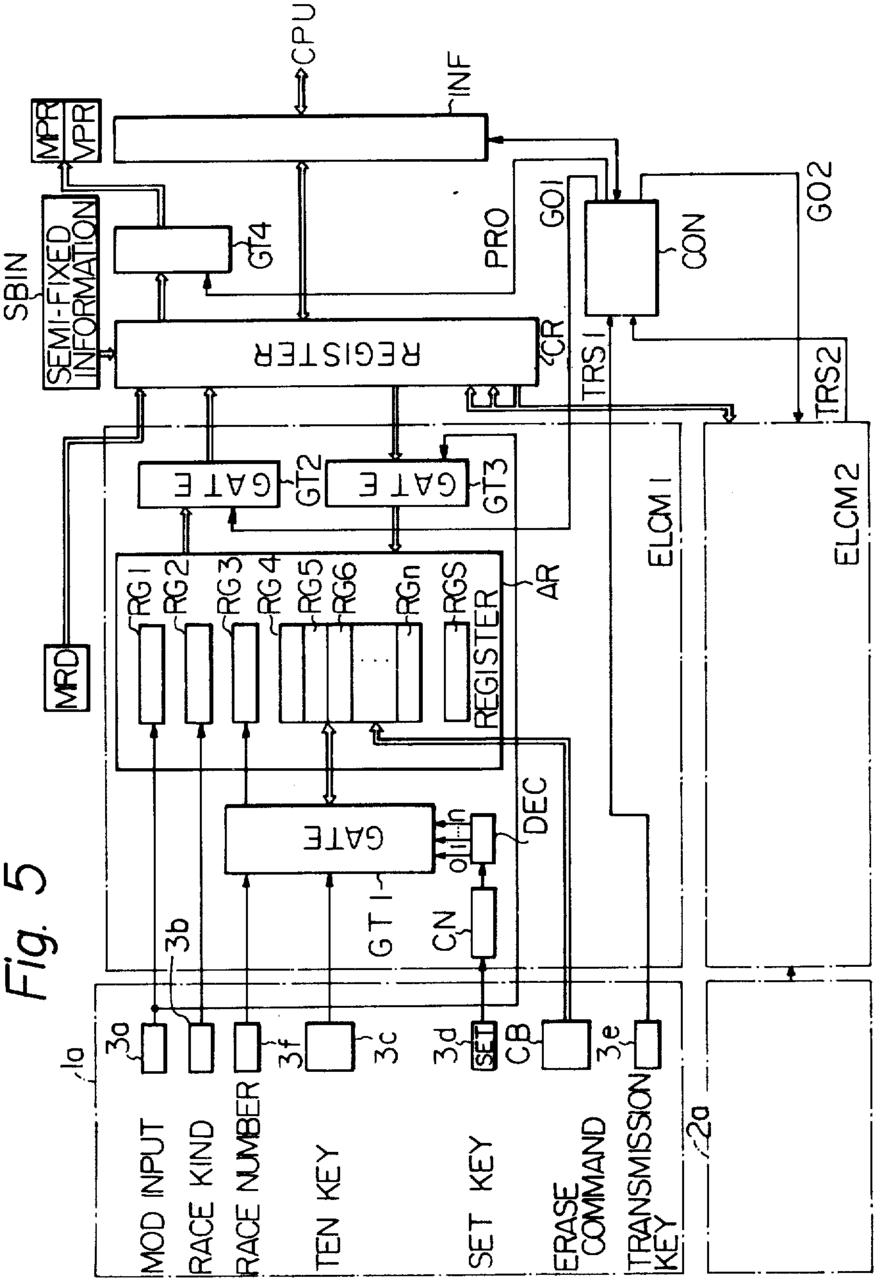
FIG. 5 is a connection diagram which shows the block diagram of FIG. 4 in more detail.

FIG. 5 is a connection diagram which shows the block diagram of FIG. 4 in more detail. In FIG. 5, the same symbols as in FIG. 4 are used to identify the same components found in FIG. 5, and CN shows a counter, DEC shows a decoder, $RG_1$ through $RG_n$ and $RG_s$ show registers and $GT_1$ through $GT_4$ show gate circuits.

With reference to both FIGS. 3 and 5, during the printing process of the multi-betting tickets, the operator first pushes the betting key 31, whereby a coded signal indicating the betting mode is provided via mode input keys 3*a* and stored in the predetermined register $RG_1$ of the input register AR. When the operator pushes one of the keys W, P, or F belonging to the group of betting information keys 3*b*, the betting information code corresponding to the pushed key is stored in the register $RG_2$. Next, when the operator pushes the race number input key *3f* and a succession of any of the ten keys *3c* corresponding to the race number said race number is provided via the gate circuit $GT_1$ and stored in the register $RG_3$. After the operator pushes the set key *3d*, the betting information is provided as an input as follows. The counter CN is set to zero value at the beginning of the printing of the multi-betting tickets and said counter CN increases by one count every time the set key *3d* is operated. Since the set key *3d* is operated after the race number has been inputted, the content of the counter CN has a value "1" at that time. The content of said counter CN is applied to the decoder DEC wherein said content is decoded and the output signal logic "1" is supplied on any of the lines 1, . . . , *n*, in accordance with the content of the counter CN. For example, when the content of the counter is "1", the logical output "1" appears on line 1, and the logical output "0" appears on the other lines.

After inputting the race numbers, the operator then pushes a succession of the ten keys *3c* to supply the betting numbers and the number of the unit, at which time only the gates included in the gate $GT_1$ corresponding to the register $RG_4$ are opened, whereby the code signal corresponding to the betting numbers and the number of units is stored in the register $RG_4$. The betting numbers are indicated by a two-figure number.

Prior to the time that the operator inputs the next betting number and the next number of the unit, he will operate the set key for setting the content of the counter CN to the value "2" so as to open the gate $GT_1$, corresponding to register $RG_5$, and so forth.

After inputting the betting numbers and the number of the units in the same manner as shown above, the operator then operates the transmission key *3e* to generate the transmission signal $TRS_1$ and to supply said signal to the transmission control circuit CON. When the key board *2a* of the input device 2 (FIG. 4) is not in an operating condition, the transmission control circuit CON generates a gate signal $GO_1$ to open the gate circuit $GT_2$. As a result all contents of the input register AR are transferred to the register CR, and further, said contents are supplied via the interface circuit INF to the computer CPU. However, when the keyboard *2a* is in an operating condition, the contents of the input register AR will not be shifted to the register CR. Only after said operating condition has finished, will said content be transferred to the register CR.

The total sum of betting units sent from the computer is stored in the register CR and also stored via the gate circuit $GT_3$ in the register RGS. Said total sum is displayed in the total amount indicator SD shown in FIG. 3. When the signal which commands the printing is supplied from the computer CPU to the control circuit CON, said circuit CON generates a signal PRO which commands the issuing of the ticket and opens the gate circuit $GT_4$. Thus, the content of the register CR is supplied to the magnetic recorder MPR, and to the printing device VPR which then prints the multi-betting ticket. In FIG. 5, the symbol $ELCM_2$ is a circuit of the input device 2 (FIG. 4) wherein the construction of said circuit is the same as the circuit $ELCM_1$ (FIG. 5) of the input device 1 (FIG. 4). Thus, the signal $TRS_2$ is for operating the transmission key of the keyboard *2a*, and the signal $GO_2$ corresponds to the gate signal $GO_1$ discussed above.

Figure 6:
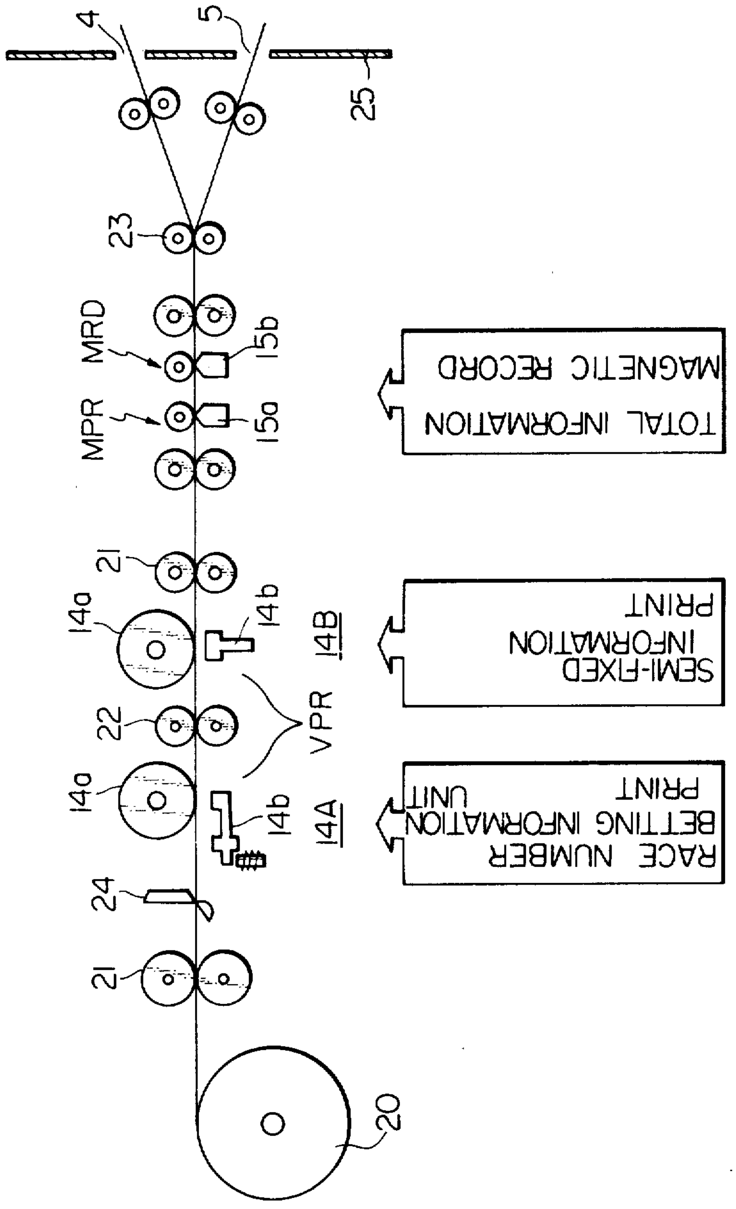
FIG. 6 is a diagram which shows a paper feeding device, a printing device and a magnetic recording device of the apparatus shown in FIG. 2.

FIG. 6 shows the relation among the paper supply device PS, the printing device VPR and the magnetic recorder MPR. The mechanism shown in FIG. 6 includes a paper supply device PS which comprises a roll of paper 20 which is the original paper of the multi-betting ticket, a pair of paper feed rollers 21, a pair of pinch feed rollers 22, a pair of separating rollers 23, a cutter 24, a housing 25, and the openings 4 and 5 for issuing the tickets. The printing device VPR is composed of a portion 14A wherein the variable information, such as the race number, the betting information of the race, the betting numbers and the units are printed, and of a portion 14B wherein the semi-fixed information, such as Year, Time, and Name of race course are printed. Portions 14A and 14B each have a type or a type wheel 14*a*. A group of types and a hammer 14*b* are arranged in each portion. The magnetic recorder MPR and the magnetic reader MRD are provided with a magnetic writing head 15*a* and a magnetic reading head 15*b*, respectively.

The multi-betting ticket is published, as described below, in accordance with the signal which commands the printing and with the betting information which is obtained from the register CR. The register CR stores the semi-fixed information supplied from the semi-fixed information input apparatus SBIN (FIG. 4), the betting information, and the total sum sent from the computer CPU. The information thus stored in said register CR are then transferred to the printing device VPR and to the magnetic recorder MPR.

In the printing device VPR, the roll of paper 20 to be used for the multi-betting ticket is first fed into the VPR by the paper feed rollers 21, and then said paper 20 is cut at predetermined lengths by the cutter 24 for forming the individual betting tickets. The variable information is printed onto said betting ticket in the typing portion 14A by the striking of the hammer 14*b* upon the betting ticket paper and the type wheel 14*a*. Next, the semi-fixed information is typed onto said paper in the typing portion 14B. Typing in said portions 14A and 14B are carried out by the visible typing means using ink, carbon, or perforation.

The multi-betting ticket 10 (FIG. 1) containing only the typed and not the magnetically recorded variable and semi-fixed information is supplied to the magnetic recorder wherein both variable and semi-fixed information are magnetically recorded onto the ticket 10 by the magnetic writing head 15*a* (FIG. 6). The magnetic reading head 15*b* provided nearby said magnetic writing head 15*a* immediately reads said magnetically recorded information on said ticket 10 and checks for errors in said recorded information. A secret code for preventing malpractice in the system is also recorded onto the magnetically recorded portion.

The betting ticket 10 with the correct magnetically recorded information is further directed by the separating rollers 23 to the openings 4 or 5 (FIG. 2) so as to be produced as output. The separating rollers 23 are provided with a deflector at the output side. If the betting ticket is produced by the input device 1, said betting ticket is directed to the opening 4. If the betting ticket is produced by the input device 2, said betting ticket is then directed to the opening 5. That is, since the terminal equipment is provided with two input devices and is operated by two different operators, the separating rollers 23 are employed for conveying each completed and respective multi-betting ticket to each corresponding operator.

Printing of the multi-betting ticket was described hereinabove. Next, we will explain the partial correction of the multi-betting ticket according to the present invention with reference to FIGS. 3 through 5.

We assume that the column of "1-7, 27 unit" in the multi-betting ticket shown in FIG. 1 should corrected because said column was typed due to a mistaken election by the spectator or due to a miskeyed operation by the operator. In that case, the operator operates the subtracting key 32 and inserts the incorrect multi-betting ticket into the inserting opening 8 or 9 shown in FIG. 2. When the multi-betting ticket is inserted into the insertion opening 8 or 9, the magnetic reader MRD reads the semi-fixed information, the betting information and the total sum magnetically recorded on the reverse side of the multi-betting ticket, this information, in turn, being memorized in the register CR shown in FIG. 5. The code signal which indicates the subtraction is stored in the register $RG_1$. When said code signal opens the gate $GT_3$, the content of the register CR is transferred to the input register AR, and said betting information and said total sum are displayed on the display panel 1*b* of the input device 1. As the betting information erasing indicators $EK_1$ through $EK_5$ are provided with respect to each of the betting information displays CD and MD on the display panel 1*b*, the operator pushes the erasing indicator $EK_3$ for erasing the corresponding betting information 1-7, 27 unit. Then, the subtraction code 1 is added to the most significant bit in the register $RG_6$. Next, when the operator pushes the transmission key 3*e*, the content of the register AR is sent with the semi-fixed information supplied from the semi-fixed information input means SBIN via the gate circuit $GT_2$, the register CR, and the interface INF to the computer CPU.

Figure 7:
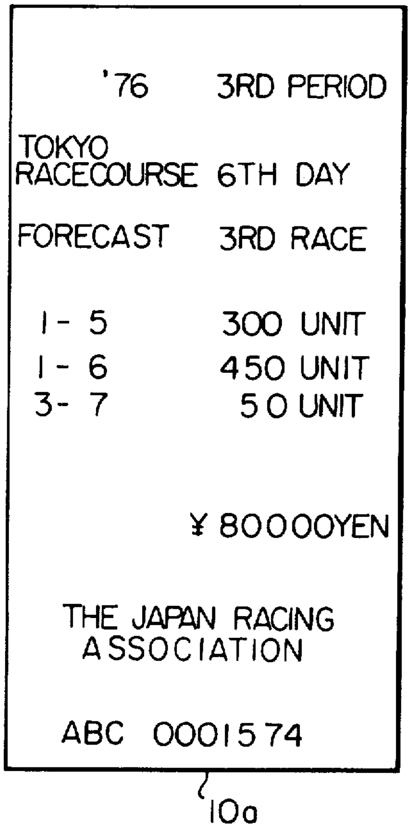
FIG. 7 shows one example of the multi-betting ticket after the correction of its partial information.

When the computer CPU receives this information, said computer CPU erases the betting information 1-7, 27 unit to which the subtracting mark is attached, and then transfers the rest of the betting information, the total sum, and the balance to the register. At the same time, the computer CPU sends the Print Command signal to the transmission control unit CON. This information is sent via the gate circuit $GT_3$ to the input register AR, under the control of the transmission control circuit CON, and said information is displayed on the display panel 1*b*. On the other hand, the printing device VPR and the magnetic recorder MPR print the information on the paper, according to the content of register CR, in the same manner as when the multi-betting ticket was originally printed. A new multi-betting ticket 10*a* as shown in FIG. 7 is printed and produced as output from the opening 4. At the same time, the invalidated original multi-betting ticket 10 marked with a code is stored in the main body 3.

Figure 9A:
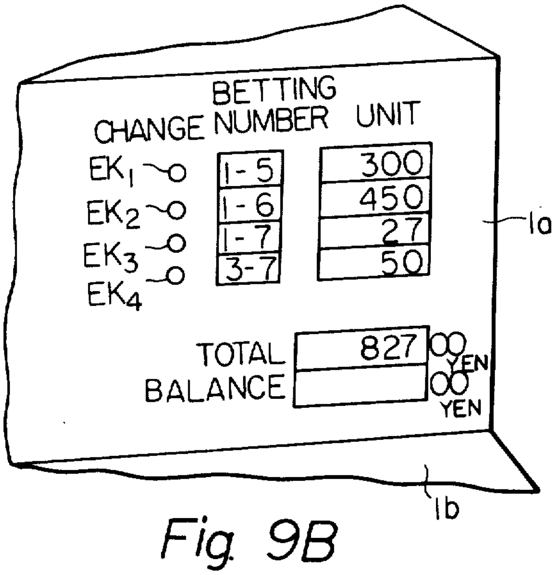
Figure 9B:
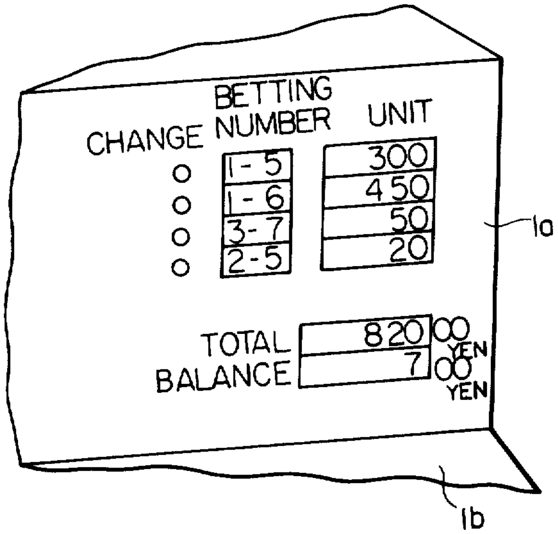

The above-mentioned explanation concerns only the process of partial erasure, that is, the subtraction process. However, a partial change can be carried out in accordance with the present invention. When the operator wishes to change the betting information 1-7, 27 unit on the multi-betting ticket shown in FIG. 8A to the betting information 2-5, 20 unit on the multi-betting ticket shown in FIG. 8B, this operation can be easily carried out by changing the circuit shown in FIG. 5 as follows. When the operator inserts the multi-betting ticket 10 into the insertion opening 8, the reading portion MRD reads the information on said ticket 10, and said information is then displayed on the display panel 1*a* as shown in FIG. 9A. The operator pushes the key $EK_3$ for changing the corresponding betting information 1-7, 27 unit. Therefore, the information displayed on the column 1-7, 27 unit is erased, and the information of the next column is shifted upwardly whereby the lowest column becomes blank. Next, when the operator operates the keyboard 1*a* and supplies the betting information to be added 2-5, 20 unit, the information on the display panel is changed to as shown in FIG. 9B. Next, this information is transferred to the computer CPU by pressing the transmission key 3*e*. In this case, the betting information 1-2, 27 unit is transferred with the subtracting mark, the information 2-5, 20 unit is transferred with the adding mark, and the rest of the information is transferred with the transcription mark. The computer CPU refiles this information and sends back the rest of the information, the newly inserted information, the total sum and the balance to the main body 3. All of these data are stored in the register CR; the printing device VPR and the magnetic recorder MPR print and record, respectively, on the paper based on information stored in the register CR; and the new multi-betting ticket as shown in FIG. 8B is published. The content of the betting information on the new multi-betting ticket is displayed on the display panel 1*a* as shown in FIG. 9B. With respect to the original multi-betting ticket 10, the subtraction mark is attached to the subtracting betting information 1-7, 27 unit, the newly added betting information 2-5, 20 unit is indicated, and said ticket 10 is kept in the main body 3 as an invalidated ticket.

The change of the multi-betting ticket shown in FIG. 1 to the new multi-betting ticket can be carried out by sending only the subtracting information to the computer CPU. In this case, the computer CPU refiles the betting information basing on said subtracting information, and the new betting ticket is printed by the terminal equipment It is understood that said terminal equipment is provided with calculating functions for calculating the total sum and the balance of the amounts shown on the multi-betting tickets.

Figure 10A:
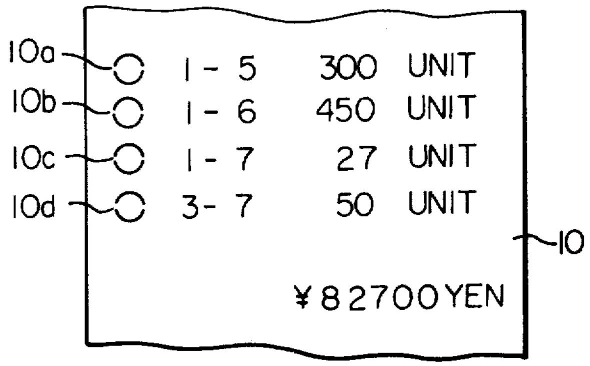
Figure 10B:
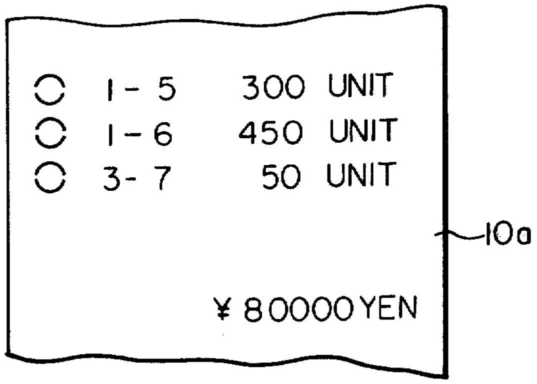

The erasure or the change of the betting information can be carried out as shown in FIGS. 10A and 10B, by not using the keys $EK_1$ through $EK_5$. As shown in FIG. 10A, circle marks corresponding to 10*a* through 10*d* which are formed with sewing mesh are placed on the left side of each item of the betting information. When the operator wishes to erase the information 1-7, 27 unit from the multi-betting ticket shown in FIG. 10A, he punches the circle mark 10C corresponding to said information with a pencil or with another suitable instrument. In the terminal equipment, a hole detecting means, not shown in the drawing, is provided instead of the keys $EK_1$ through $EK_3$. When the perforated multi-betting ticket is inserted via the inserting opening 8, the hole detecting means detects the perforated circle mark 10C and sends a signal which is same as that generated when the erase key $EK_3$ is pushed. The operations carried out hereinafter are the same as those shown in FIG. 3. By the final operational step a ticket as shown in FIG. 10B is printed from the terminal equipment.

FIG. 11 shows another embodiment of the input device 1 which has a function of correcting the partial information of the multi-betting ticket, and the same elements as those of FIG. 3 are shown with the same symbols. Elements different from those of FIG. 3 include an erase key 3*g* and betting information indication displays $LD_1$ through $LD_5$ instead of the erase indication keys $EK_1$ through $EK_5$. The operation of printing the multi-betting ticket is quite similar to that of FIG. 3. The only difference between the embodiment of FIG. 3 and that of FIG. 11 is that the indication mark " " in the betting information indication displays $LD_1$ through LD5 is shifted on line below every time the operator operates the set key 3*d*.

In the operation of erasing the partial information from the multi-betting ticket, after the magnetic reader MRD has read the information of the multi-betting ticket and after the display panel 1*b* has displayed said information thereon, the operator then operates repeatedly the set key 3*d* until the indication mark " " is positioned in the betting information indication display $LD_3$ which corresponds to the information 1-7, 27 unit to be erased. Next, the operator operates the erase key 3*g* so as to record the subtraction code on the most significant figure of the register which stores the information 1-7, 27 unit and to send said information to the computer by operating the transmission key.

As clear from the above-mentioned explanation, according to the present invention, the partial correction of the multi-betting ticket can be carried out simply and rapidly without affecting the rest of the information on said ticket. Further, as the invalidated original ticket is stored, with the corrected portion clearly indicated, in the terminal equipment, malpractice can be effectively prevented.

What is claimed is:

1. An apparatus for use with a central processor in selling betting tickets wherein betting information recorded on an original betting ticket may be altered by said central processor in accordance with operator instructions and a new betting ticket containing altered betting information issued, said apparatus comprising means for reading the betting information from said original betting ticket, means for displaying said betting information, indication means responsive to said operator instructions for providing an output indicating the betting information to be altered, said central processor being responsive to said output of said indication means for altering the betting information so as to provide said altered betting information, and recording means for recording the altered betting information on said new betting ticket.

2. An apparatus for selling betting tickets according to claim 1, wherein said apparatus is further provided with input means for inputting said operator instructions, said instructions including add instructions indicating that further betting information is to be added, and including erase instructions indicating that certain information is to be deleted, and wherein said recording means records the betting information read by the reading means from said original betting ticket, with the betting information to be added and without the certain information to be deleted.

3. An apparatus for selling betting tickets according to claim 1 wherein said betting information is magnetically recorded on said original betting ticket, said reading means including a magnetic record reader.

4. An apparatus for selling betting tickets according to claim 3 wherein said recording means includes a magnetic record writer.

5. An apparatus for selling betting tickets according to claim 1 wherein said recording means includes a ticket printer.

6. An apparatus for selling betting tickets according to claim 1 where said indication means includes a first register connected to said reading means for receiving said betting information recorded on said original betting ticket, a second register connected to said displaying means, and control means responsive to said operator instructions for issuing a first control signal causing the transfer of said betting information in said first register to said second register, said displaying means being responsive to said first control signal for displaying said betting information recorded on said original betting ticket.

7. An apparatus for selling betting tickets according to claim 6 wherein said operator instructions include an erase instruction indicating desired deletion of a portion of said betting information, said indication means being responsive thereto for flagging said portion of said betting information to be deleted, said control means being responsive to said erase instruction for transferring said contents of said second register to said central processor which deletes said portion of said betting information to be deleted.

8. An apparatus for selling betting tickets according to claim 7 wherein said operator instructions include an add instruction indicating desired addition of new betting information, said apparatus including input means for receiving said new betting information and for providing same to said second register, said second register being responsive to said add instruction for receiving said new betting information, said control means being responsive to said add instruction for providing the contents of said second register to said central processor which adds said new betting information to be added.

9. An apparatus for selling betting tickets according to claim 6 wherein said operator instructions include an add instruction indicating desired addition of new betting information, said apparatus including input means for receiving said new betting information and for providing same to said second register, said second register being responsive to said add instruction for receiving said new betting information, said control means being responsive to said add instruction for providing the contents of said second register to said central processor which adds said new betting information to be added.

10. An appartus for selling betting tickets according to claim 6 wherein said first register has an output connected to said recording means and is responsive to a record command from said control means for receiving said altered betting information from said central processor and for providing same to said recording means.

11. An apparatus for selling betting tickets according to claim 6 wherein said recording means includes a ticket printer and said first register has an output connected to said recording means and is responsive to a print command from said control means for receiving said altered betting information from said central processor and for providing same to said ticket printer.

12. An apparatus for selling betting tickets according to claim 1 including means for computing, from said altered betting information, revised summation information and for providing said revised summation information to said recording means, said recording means being responsive thereto for recording same on said new betting tickets.

13. An apparatus for selling betting tickets according to claim 12 wherein said revised summation information is also provided to said displaying means for display to said operator.

14. An apparatus for selling betting tickets according to claim 1 wherein said altered betting information from said central processor is also provided to said displaying means for display to said operator.

* * * * *

UNITED STATES PATENT OFFICE
CERTIFICATE OF CORRECTION

Patent No. 4,032,946 Dated June 28, 1977

Inventor(s) YUZO WAKATSUKI et al

It is certified that error appears in the above-identified patent and that said Letters Patent are hereby corrected as shown below:

Column 1, line 59, change "subtractor" to --subtracter--.
Column 1, line 62, delete "and".
Column 7, line 4, after "should" insert --be--.
Column 7, line 35, after "erases" insert --from its file--.
Column 8, line 33, change "basing" to --based--.
Column 8, line 35, after "equipment" insert a period.
Column 9, line 3, between the quotation marks insert the symbol --▶--.
Column 9, line 4, change "LD5" to --$LD_5$--.
Column 9, line 11, between the quotation marks insert the symbol --▶--.

Signed and Sealed this

[SEAL] *Fourth* Day of *October 1977*

*Attest:*

RUTH C. MASON
*Attesting Officer*

LUTRELLE F. PARKER
*Acting Commissioner of Patents and Trademarks*